United States Patent

[11] 3,625,984

[72] Inventors: Seymour David Levine, North Brunswick; Patrick Andrew Diassi, Westfield; Frank Lee Weisenborn, Somerset, all of N.J.
[21] Appl. No. 773,640
[22] Filed Nov. 5, 1968
[45] Patented Dec. 7, 1971
[73] Assignee E. R. Squibb & Sons, Inc. New York, N.Y.

[54] CYCLOHEXA-1,4-DIENE-1-ACETIC ACIDS
2 Claims, No Drawings
[52] U.S. Cl.................................................. 260/396 N, 260/247.2 R, 260/294 S, 260/295 S, 260/501.1, 260/514 R, 260/515 R, 424/316, 424/317
[51] Int. Cl.................................................. C07c 1/22
[50] Field of Search............................................ 260/468, 514, 396

[56] References Cited
OTHER REFERENCES
Camps, Index Chemicus 29 No. 94490, 1968
Beilstein Band IX p. 64 2nd rev. 1932

Primary Examiner—Lorraine A. Weinberger
Assistant Examiner—Robert Gerstl
Attorneys—Lawrence S. Levinson, Merle J. Smith and Theodore J. Criares ABSTRACT: This invention relates to new cyclohexa-1,4-diene-1-acetic acids of the formula

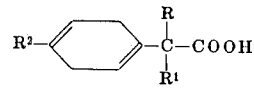

wherein R, R$^1$ and R$^2$ each is hydrogen or lower alkyl, and salts of these acids with bases, which are useful as anti-inflammatory agents.

CYCLOHEXA-1,4-DIENE-1-ACETIC ACIDS

DESCRIPTION OF THE INVENTION

This invention relates to new cyclohexa-1,4-diene-1 acetic acids of the formula (I)

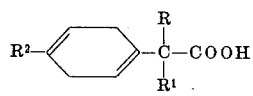

wherein R, $R^1$ and $R^2$ each is hydrogen or a straight or branched chain lower alkyl group such as methyl, ethyl, propyl, isopropyl, butyl, isobutyl, amyl or the like. It also includes salts with organic and inorganic bases.

These new compounds are produced by reduction of a compound of the formula (II)

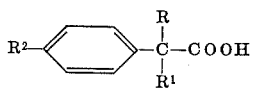

with a metal, e.g., an alkali metal such as sodium, potassium or lithium, in liquid ammonia or an amine, e.g., a lower alkylamine such as methylamine, ethylamine, isopropylamine or the like, a di-lower alkylamine such as dimethylamine or the like, or a heterocyclic amine such as morpholine, etc., in the presence of a proton donor such as methyl alcohol, ethyl alcohol, isopropyl alcohol or t-butyl alcohol, preferably at a low temperature, e.g., −70° to −33° C.

The cyclohexa-1,4-diene-1-acetic acids of formula I form salts with organic bases, e.g., alkylamines such as methylamine, ethylamine, isopropylamine, dimethylamine, etc. and heterocyclic amines such as pyridine, piperidine, morpholine and the like, and with inorganic bases, e.g., ammonium hydroxide, alkali metal hydroxides such as sodium hydroxide, potassium hydroxide, etc., alkaline earth metal hydroxides such as calcium hydroxide, barium hydroxide, etc., alkali metal carbonates and bicarbonates such as sodium carbonate, potassium bicarbonate, etc. These basic salts may be used in the preparation and/or isolation of the products of this invention. When the product is produced in the form of the basic salt, neutralization with an acid, e.g., a mineral acid such as hydrochloric acid will yield the compound in the acid form. Other basic salts may then be formed by reaction with the appropriate organic or inorganic base.

The compounds of this invention are useful as anti-inflammatory agents and are effective in the prevention and inhibition of granuloma tissue formation in warmblooded animals, for example, in a manner similar to indomethacin. They may be used to decrease joint swelling tenderness, pain and stiffness, in mammalian species, e.g., in conditions such as rheumatoid arthritis. A compound of formula I or a physiologically acceptable salt of the character described above may be compounded according to accepted pharmaceutical practice in oral dosage forms such as tablets, capsules, elixirs or powders for administration of about 100 mg. to 2 g. per day, preferably 100 mg. to 1 g. per day, in two to four divided doses. For example, about 150 mg./kg./day is effective in reducing ankle swelling in rats.

The following examples are illustrative. Temperatures are on the centigrade scale.

EXAMPLE 1

Cyclohexa-1,4-diene-1-acetic acid

To a solution of 1.0 g. of phenylacetic acid in 20 ml. of absolute ethanol contained in a three-necked round bottom flask equipped with a stopper, dry ice reflux condenser and drying tube is distilled 30 ml. of ammonia previously dried over lithium. To this stirred solution at −40° C. is added 0.6 g. of lithium in small pieces over a 5 minute period and the mixture stirred for 40 minutes at this temperature. An additional 0.4 g. of lithium is then added and the mixture is refluxed for 1 hour. About 2 g. of ammonium chloride are then added and the mixture is allowed to evaporate. The residual ammonium salt is dissolved in water, acidified with 2N hydrochloric acid and extracted with ethyl acetate. The ethyl acetate extracts are washed with water, dried over sodium sulfate and evaporated to dryness under reduced pressure. Crystallization of the residue from hexane gives 883 mg. of cyclohexa-1,4-diene-1-acetic acid, m.p. 105°–107°.

EXAMPLE 2

4-Isopropyl-cyclohexa-1,4-diene-1-acetic acid

A solution of 1.0 g. of p-isopropylphenylacetic acid in 20 ml. of absolute ethanol and 30 ml. of ammonia is treated with 0.6 g. of lithium in portions over a 5 minute period. The solution is stirred at −35° to 40° for 45 minutes, and then treated with an additional 0.4 g. of lithium and refluxed for 1 hour. Ammonium chloride is then added and the ammonia is allowed to evaporate at room temperature. The residual salt is dissolved in water and acidified with 2N hydrochloric acid. The precipitate is collected by filtration and air-dried to give 851 mg. of 4-isopropyl-cyclohexa-1,4-diene-1-acetic acid, m.p. 73.5°–75.5°. An analytical sample is prepared by recrystallization from petroleum ether, m.p. 75.5°–76°.

EXAMPLE 3

4-Isobutyl-cyclohexa-1,4-diene-1-acetic acid

Following the procedure of example 1 but substituting p-isobutylphenylacetic acid for the phenylacetic acid there is obtained 4-isobutyl-cyclohexa-1,4-diene-1-acetic acid, m.p. 72°–74.

EXAMPLE 4

α,α-Dimethyl-cyclohexa-1,4-diene-1-acetic acid

Following the procedure of example 1 but substituting methylhydratropic acid for the phenylacetic acid there is obtained α,α-dimethyl-cyclohexa-1,4-diene-1-acetic acid, m.p. 58°–60.

EXAMPLE 5

α-Ethyl-cyclohexa-1,4-diene-1-acetic acid

Following the procedure of example 1 but substituting α-phenylbutyric acid for the phenylacetic acid there is obtained α-ethyl-cyclohexa-1,4-diene-1-acetic acid, m.p. 43°–45°.

EXAMPLE 6

α-Methyl-4-isobutyl-cyclohexa-1,4-diene-1-acetic acid

Following the procedure of example 1 but substituting α-(4-isobutylphenyl)propionic acid for the phenylacetic acid, there is obtained α-methyl-4-isobutyl-cyclohexa-1,4-diene-1-acetic acid.

EXAMPLE 7

Following the procedure of examples 1 through 6 but substituting sodium or potassium, respectively, for the lithium, the amines methylamine, ethylamine, isopropylamine, dimethylamine and morpholine, respectively, for the ammonia, and the alcohols methyl alcohol, isopropyl alcohol and t-butyl alcohol, respectively, for the ethyl alcohol, the same products are obtained.

We claim:
1. 4-Isobutyl-cyclohexa-1,4-diene-1-acetic acid.
2. Physiologically acceptable basic salts of the compound of claim 1.

\* \* \* \* \*